United States Patent [19]

Carson

[11] 4,058,173

[45] Nov. 15, 1977

[54] BLADE ASSEMBLY WITH REPLACEABLE CUTTING EDGE

[76] Inventor: Cyril W. Carson, 2155 Holly, Charlotte, Mich. 48813

[21] Appl. No.: 668,310

[22] Filed: Mar. 18, 1976

[51] Int. Cl.² .............................................. E02F 376
[52] U.S. Cl. .................................. 172/719; 172/753; 172/751; 403/381
[58] Field of Search ............... 172/719, 801, 753, 749, 172/751; 37/141 R; 403/380, 381, 353; 52/753 T

[56] References Cited

U.S. PATENT DOCUMENTS

| | | | |
|---|---|---|---|
| 2,291,712 | 8/1942 | Hatton | 52/753 T |
| 2,424,136 | 7/1947 | Baker | 172/751 |
| 2,674,052 | 4/1954 | Newkirk | 172/753 |
| 3,202,226 | 8/1965 | Carson | 172/719 |
| 3,477,520 | 11/1969 | Gray | 172/719 |
| 3,577,316 | 5/1971 | Piette | 403/381 |

Primary Examiner—Richard J. Johnson
Attorney, Agent, or Firm—Colton & Stone, Inc.

[57] ABSTRACT

A blade assembly for equipment such as a bulldozer, snow plow or the like has a moldboard and a replaceable blade. A plurality of rearwardly projecting lugs are provided adjacent the top edge of the blade and a corresponding plurality of sockets are provided adjacent the lower edge of the moldboard. The upper and lower surfaces of the lugs are horizontal while the side surfaces diverge rearwardly. The moldboard sockets are correspondingly configured but of greater width than the lugs. A locking bar having forwardly projecting locking lugs is detachably mounted on the rear face of the moldboard. The locking lugs are of such configuration as to substantially completely fill the portion of the socket remaining open when the blade lug has been inserted and shifted laterally in the moldboard socket.

5 Claims, 9 Drawing Figures

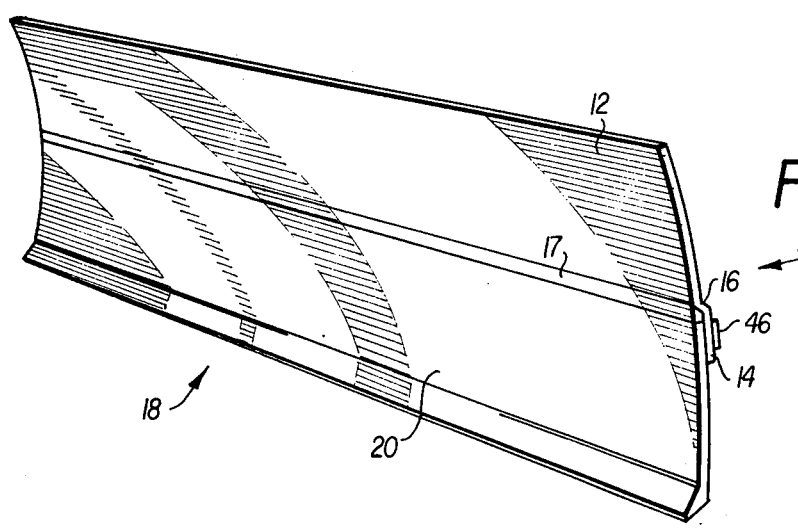
FIG. 1
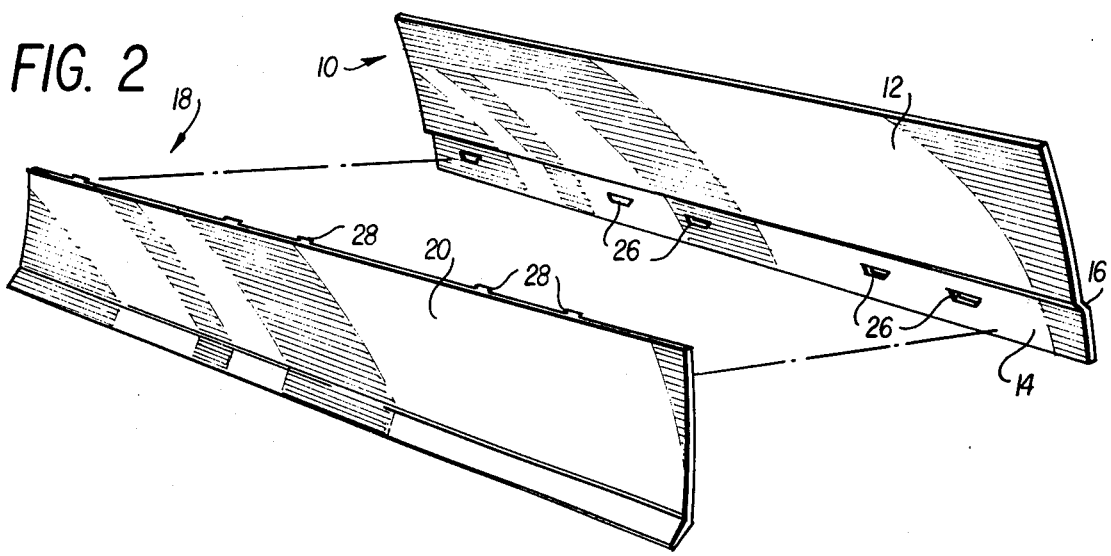
FIG. 2
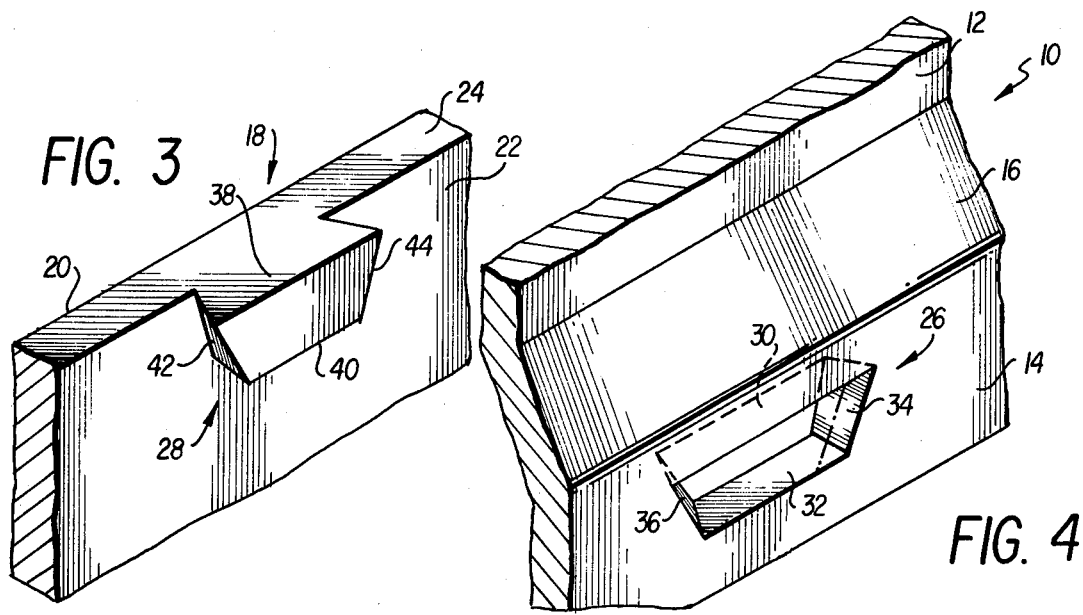
FIG. 3
FIG. 4

BLADE ASSEMBLY WITH REPLACEABLE CUTTING EDGE

BACKGROUND OF THE INVENTION

The present invention pertains to blade assemblies such as are used with bulldozers, snow plows, road graders and the like and, more particularly, to such blade assemblies including a readily detachable blade or cutting edge.

In my earlier U.S. Pat. No. 3,202,226, I provide a blade assembly with a detachable blade in which the moldboard has a plurality of openings or sockets and the blade has, on its rear face, a plurality of rearwardly projecting lugs. The sockets and lugs are of trapezoidal cross-section and permit the blade to be attached to the moldboard by inserting the lugs into the sockets, lowering the blade to seat the lugs and inserting wedges into the sockets to lock the blade in position on the moldboard. While this arrangement provides a substantial improvement over earlier systems in which bolts and nuts are employed to attach the blade to the moldboard, frequent difficulties are encountered in removing a worn blade from its moldboard. Frequently after prolonged use the blade will have developed a rearwardly extending burr or flange-like projection. Since removal of a worn blade involves a reverse sequence of operations relative to its installation, the rearwardly projecting burr presents a problem as it interfers with or prevents the lifting of the blade to free the lugs from the moldboard sockets.

U. S. Pat. No. 3,477,520 to Gray discloses a blade assembly in which detachable blades are provided with rearwardly projecting wedge blocks which engage apertures in the moldboard. An eyebolt connected between a hook projecting from the rear of the blade and a bracket mounted on the rear face of the moldboard is employed to shift the blade laterally bringing the wedge blocks into engagement with an edge of the apertures. The blade mounting arrangement, of Gray, however, does not eliminate the use of bolts and nuts which are frequently difficult to remove.

It is the primary object of the present invention to provide a moldboard and detachable blade assembly which, while retaining the advantages of easy assembly and simplicity of the assembly of my above mentioned patent, eliminates the difficulties encountered as a consequence of the formation of burrs on worn blades.

Another object of the present invention is the provision of a detachable blade assembly which is characterized by its simplicity of design and construction and by the small number of component parts.

BRIEF SUMMARY OF THE INVENTION

The above and other objects of the invention which will become apparent in the following detailed description are achieved by the provision of a blade assembly including a moldboard having a flanged lower end provided with a plurality of openings defined by parallel upper and lower walls and rearwardly diverging side walls, a detachable blade the upper porton of which overlies the flanged lower end of the moldboard and is provided with a plurality of rearwardly diverging side surfaces, the lugs being of such dimensions as to fit into the moldboard openings, and locking elements removably carried on the rear face of the moldboard flange and having forwardly projecting portions which substantially fill the spaces between one side wall of the opening and the adjacent side surface of the lug when the blade is shifted laterally so that the opposite side surface of the lug is contiguous to the corresponding wall of the opening.

For a more complete understanding of the invention and the objects and advantages thereof, reference should be had to the following detailed description and the accompanying drawing wherein a preferred embodiment of the invention is shown and described.

BRIEF DESCRIPTION OF THE DRAWINGS

In the drawings:

FIG. 1 is a perspective view of the blade assembly of the present invention;

FIG. 2 is an exploded perspective view shown the detachable blade separated from the moldboard;

FIG. 3 is a fragmentary perspective view of a portion of the detachable blade and showing one of the blade securing lugs;

FIG. 4 is a fragmentary perspective view of a portion of the moldboard and showing one of the sockets;

DETAILED DESCRIPTION OF THE PREFERRED EMBODIMENT

Figure 6:
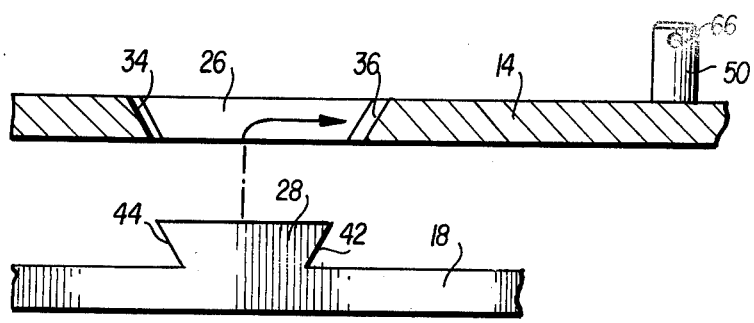
FIGS. 6, 7 and 8 are fragmentary sectional views illustrating successive steps in the blade assembly sequence.

A moldboard, designated generally by the reference numeral 10, has an upper portion 12 providing a work engaging forward face and attached by suitable, conventional mountings to a machine such as a bulldozer or road scraper. Since the mountings and the machine are conventional and do not form a part of the present invention, they have been omitted from the drawing. The moldboard 10 also has a lower portion 14 offset rearwardly from the upper portion 12 and joined thereto by an annularly disposed intermediate portion 16. A detachable blade is designated generally by the numeral 18 and has a forward work-engaging face 20 and a rear face 22 which, when the blade 18 is in its operative position, overlies the lower portion 14 of the moldboard 10 with the upper edge 24 of the blade being substantially aligned with the junction of the lower and intermediate portions 14 and 16, respective, of the moldboard. The longitudinal groove resulting between the moldboard and the upper edge of the blade is filled with a strip 17 welded to the moldboard 12.

A plurality of through openings or sockets 26 are provided at spaced intervals across the width of the lower portion 14 of the moldboard 10 and an equal plurality of equally spaced lugs 28 project rearwardly from the rear face 22 of the blade 18. Each of the openings 26 is defined by spaced, parallel upper and lower walls 30 and 32, respectively, extending perpendicular to the front face of the moldboard portion 14 and rearwardly diverging side walls 34 and 36. Preferably, the side walls 34 and 36 diverge at equal angles. Each lug 28 has parallel upper and lower surfaces 38 and 40, respectively, which are perpendicular to the rear face 22 of the blade 18 and rearwardly diverging side surfaces 42 and 44, the side surfaces diverging at the same angles as do the side walls 34 and 36 of the sockets 26. The rear vertical face of each lug 28 is of nearly the same dimensions as the forward or smaller opening of the socket 26 so that the lug 28 is freely insertable into the socket 26. Preferably, the lugs 28 project rearwardly from the rear face 22 of the blade 18 by a distance equal to the front-to-rear thickness of the lower portion 14 of the moldboard 10.

Figure 5:
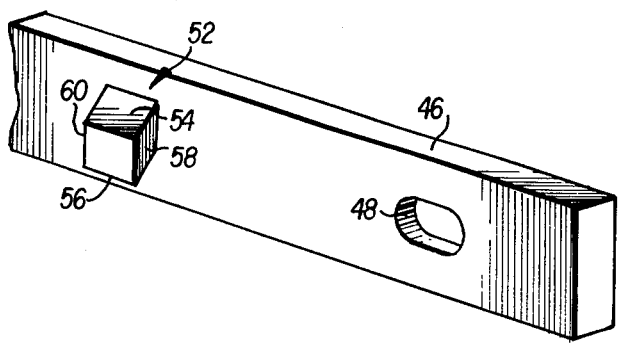
FIG. 5 is a fragmentary perspective view of the locking bar employed in the assembly of FIG. 1.
Figure 9:
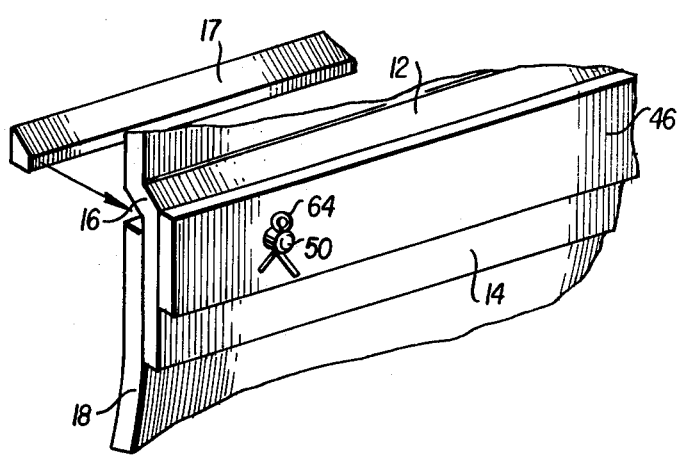
FIG. 9 is a fragmentary perspective view of the rear of the blade assembly.

The blade assembly further includes a locking bar 46 which, in the assembled position, extends along the rear face of the lower portion 14 of the moldboard 10. One or more holes 48 are provided in the bar 46 for receiving pins 50 which project rearwardly from the moldboard portion 14. Projecting forwardly from the bar 46 are a plurality of lugs 58 which, as will be apparent hereinafter, serve to lock the blade lugs 28 in the moldboard sockets 26. The total number of locking lugs 52 is equal to the number of sockets 26 and the lugs are on the same spacing as the sockets. As can be seen from FIG. 5, each locking lug has parallel upper and lower faces 54 and 56, respectively, which extend perpendicular to the bar 46 and parallel side faces 58 and 60. The side faces 58 and 60 are angled relative to the bar 46, forming the same angle therewith as one of the side surfaces, for example, the surface 44, of the lug 28 relative to the rear face 22 of the blade 18. The height of each locking lug 52 is equal to the height of the blade lug 28 and the width of the locking lug, measured on any vertical cross-section parallel to the bar 46, is nearly equal to the difference between the corresponding cross-section of the socket 26 and the moldboard lug 28.

Figure 7:
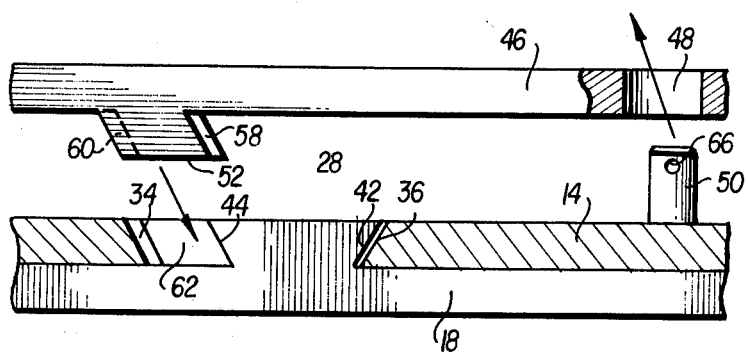
Figure 8:
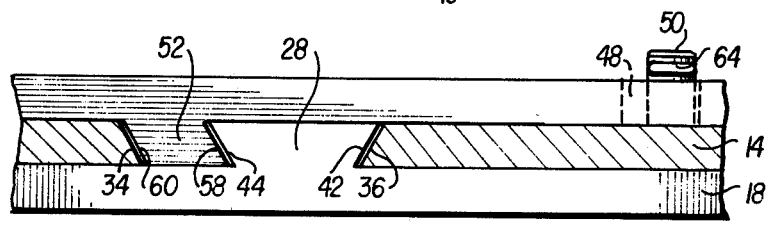

The mounting sequence for securing the detachable blade 18 to the lower portion 14 of the moldboard 10 is illustrated in FIGS. 6-8. The blade 18 is first positioned in front of the lower portion 4 of the moldboard with the lugs 28 aligned with the moldboard sockets 26. The blade is then moved rearwardly so that the lugs enter the sockets and, thereafter, shifted laterally so that one side surface, for example the surface 42, of each lug abutts the adjacent side wall, for example the wall 36, of the socket. When the blade has been shifted laterally, an opening 62 remains, the opening being defined by the wall 34 of the socket, surface 44 of the lug, and portions of the walls 30 and 32 of the socket. The locking lug 52 of the locking bar 46 is inserted into the opening 62. when the locking bar 46 has been installed, the pin 50 projects through the hole 48 of the bar and any suitable fastener, such as a cotter pin 64 inserted through the hole 66, is employed to retain the locking bar in position.

Removal of a blade from the moldboard involves the reverse sequence of operations, i.e., removal of the locking bar 46, lateral shifting of the blade 18 relative to the moldboard 12 and forward movement of the blade to disengage the lugs 28 from the sockets 26. It will be noted that no upward movement of the blade relative to the moldboard is required. Consequently, even badly worn or damaged blades which have developed rearwardly projecting burrs can be removed from the moldboard without difficulty.

While a preferred embodiment of the invention has been described in detail, it will be understood that the invention is not necessarily limited thereto. Reference should be had to the following claims in determining the true scope of the invention.

I claim:

1. A blade assembly, comprising:
   a moldboard having a rearwardly offset lower end;
   a detachable blade having an upper portion engaging said offset lower end of said moldboard;
   a plurality of lugs projecting rearwardly from the back face of said upper portion of said blade, each lug having parallel upper and lower surfaces and rearwardly diverging side surfaces;
   said lower end of said moldboard having an equal plurality of openings for receiving said lugs, each opening having parallel upper and lower walls and side walls diverging rearwardly at the same angles as the side surfaces of said lugs, the separation between said upper and lower walls being slightly greater than the height of said lug, the separation of said side walls at the forward face of said lower end being slightly greater than the width of said lug at the rear face thereof;
   an equal plurality of locking elements, each element having parallel top and bottom faces and parallel side faces which are parallel to one of the side surfaces of said lugs, the height of said element being nearly equal to the height of said opening and the width of said element being nearly equal to the difference between the maximum width of said opening and the maximum width of said lug; and
   means to retain said locking element in said socket.

2. The blade assembly of claim 1 wherein said upper and lower surfaces and said upper and lower walls extend perpendicular to the rear face of said blade and the forward face of said lower end of said moldboard, respectively.

3. The blade assembly of claim 1 wherein said means to retain comprises a bar adapted to overlie the rear face of said lower end of said moldboard, said elements projecting fowardly from said bar, and detachable means securing said bar to said moldboard.

4. A moldboard and detachable blade assembly, comprising:
   a blade having a plurality of lugs projecting from the rear face thereof adjacent the upper end thereof, each of said lugs having parallel upper and lower surfaces extending perpendicular to the rear face of said blade and rearwardly diverging side surfaces;
   a moldboard having a plurality of sockets extending therethrough adjacent the lower edge thereof, each of said sockets having parallel upper and lower walls extending perpendicular to the front face of said moldboard and rearwardly diverging side walls, said side walls diverging at the same angles as do the side surfaces of the lugs, the openings in said front face of said moldboard defined by the intersection of the walls of each socket therewith being of the same height and configuration as the corresponding rear face of each lug and dimensioned longer in length so as to allow insertion of said lugs into said sockets; and
   means for locking said lugs in said sockets, said means including a plurality of locking lugs, each locking lug being of such dimensions as to substantially fill the portion of said socket left open when said first-mentioned lug is located therein with one side surface abutting a side wall of said socket.

5. The moldboard and detachable blade assembly of claim 4 wherein said locking lugs project forwardly from a bar and said means further includes means for securing said bar to the rear face of said moldboard.

* * * * *